US012599519B2

(12) United States Patent
Thomas et al.

(10) Patent No.: US 12,599,519 B2
(45) Date of Patent: Apr. 14, 2026

(54) WHEELCHAIR DOCKING SYSTEM FOR A VEHICLE

(71) Applicant: GM Global Technology Operations LLC, Detroit, MI (US)

(72) Inventors: Dontreal Thomas, Detroit, MI (US); Mark Edward Montayne, Royal Oak, MI (US); Jeff E. Nasca, Bloomfield Township, MI (US)

(73) Assignee: GM GLOBAL TECHNOLOGY OPERATIONS, Detroit, MI (US)

( * ) Notice: Subject to any disclaimer, the term of this patent is extended or adjusted under 35 U.S.C. 154(b) by 413 days.

(21) Appl. No.: 18/307,061

(22) Filed: Apr. 26, 2023

(65) Prior Publication Data

US 2024/0358566 A1 Oct. 31, 2024

(51) Int. Cl.
*A61G 3/08* (2006.01)
*A61G 5/10* (2006.01)

(52) U.S. Cl.
CPC .............. *A61G 3/0808* (2013.01); *A61G 5/10* (2013.01)

(58) Field of Classification Search
CPC ...... A61G 3/0808; A61G 3/00; A61G 3/0891; A61G 3/0833; A61G 3/085; A61G 3/0883; A61G 3/0825; B60N 2/245
USPC .......................................................... 296/19
See application file for complete search history.

(56) References Cited

U.S. PATENT DOCUMENTS

| | | | | |
|---|---|---|---|---|
| 7,425,110 | B2 * | 9/2008 | Ditch | A61G 3/0808 410/7 |
| 12,162,139 | B1 * | 12/2024 | Gonzalez Diaz | B25J 15/08 |
| 2008/0079252 | A1 * | 4/2008 | Shutter | A61G 3/0808 280/755 |
| 2023/0064211 | A1 * | 3/2023 | Jeihani | A61G 3/061 |
| 2024/0252372 | A1 * | 8/2024 | Vandewall | B64D 11/06 |

* cited by examiner

*Primary Examiner* — Amy R Weisberg
*Assistant Examiner* — Philip Charles Adams
(74) *Attorney, Agent, or Firm* — CANTOR COLBURN LLP

(57) ABSTRACT

A wheelchair docking station for a wheelchair in a vehicle includes a first brace including a first brace arm, the first brace being mountable in the vehicle, and a second brace including a second brace arm, the second brace being mountable in the vehicle. The second brace is spaced from the first brace by a gap including a gap axis that is parallel to each of the first brace and the second brace. The first brace arm includes a first brace surface that is selectively shiftable toward the gap axis to engage a first wheel of the wheelchair, and the second brace arm includes a second brace surface that is selectively shiftable toward the gap axis to engage a second wheel of the wheelchair.

14 Claims, 9 Drawing Sheets

WHEELCHAIR DOCKING SYSTEM FOR A VEHICLE

INTRODUCTION

The subject disclosure relates to the art of wheelchair docks and, more particularly, to a wheelchair docking station for a vehicle.

Individuals using a wheelchair have a number of options for using a vehicle depending upon disability level. Individuals may enter the vehicle through a front driver door or a front passenger door and either by themselves, or with assistance, store the wheelchair. Other individuals may employ a ramp or a lift system that raises them and their wheelchair into the vehicle. Such individuals then manipulate their wheel chair to a driver's or passenger position. When in the driver's or passenger's position, the wheelchair is held in place or docked. Conventional docking systems employ an anchor mounted to a vehicle floor that connects with a pin mounted to the wheelchair.

As the individual in the wheelchair approaches the driver's or passenger's position the pin is guided into and retained by the anchor. The anchor often times includes a central slot having angled side portions. The angled side portions guide the pin into a locking member. The locking member retains the pin in order to secure the wheelchair in the driver's or passenger's position. The single anchor point provided by the pin does not constrain all movement of the wheelchair. As such, many users experience a level of discomfort with such docking systems. Accordingly, it is desirable to provide a system for docking a wheelchair that includes multiple anchor points in order to reduce undesirable wheelchair movement.

SUMMARY

A wheelchair docking station for a wheelchair in a vehicle in accordance with a non-limiting example, includes a first brace including a first brace arm, the first brace being mountable in the vehicle, and a second brace including a second brace arm, the second brace being mountable in the vehicle. The second brace is spaced from the first brace by a gap including a gap axis that is parallel to each of the first brace and the second brace. The first brace arm includes a first brace surface that is selectively shiftable toward the gap axis to engage a first wheel of the wheelchair, and the second brace arm includes a second brace surface that is selectively shiftable toward the gap axis to engage a second wheel of the wheelchair.

In addition to one or more of the features described herein a first support surface is arranged on a first side of the gap axis and a second support surface is arranged on a second side of the gap axis that is opposite the first side, the first brace being operatively connected to the first support surface and the second brace being operatively to the second support surface.

In addition to one or more of the features described herein a first clamping mechanism is mounted at the first support surface and coupled to the first brace surface and a second clamping mechanism is mounted at the second support surface and connected to the second brace surface, and a docking actuator is connected to the first clamping mechanism and the second clamping mechanism, the docking actuator being operable to shift the first brace surface toward the first wheel and the second brace arm toward the second wheel.

In addition to one or more of the features described herein the docking actuator includes a first motor operatively connected to the first brace arm and a second motor operatively connected to the second brace arm, the first motor including a first axle supporting a first drive member and the second motor including a second axle supporting a second drive member, the first motor being operable to shift the first brace arm across the first support surface and the second brace arm across the second support surface.

In addition to one or more of the features described herein the first axle extends substantially parallel to the gap axis and includes a first end and a second end opposite the first end, the first drive member including a first gear mounted to the first end and a second gear mounted to the second end and the second axle extends substantially parallel to the gap axis and includes a first end portion and a second end portion opposite the first end portion, the second drive member including a third gear mounted to the first end portion and a fourth gear mounted to the second end portion.

In addition to one or more of the features described herein a sensor is coupled to the first motor, the sensor detecting a parameter of the first motor associated with pressure being applied to the first wheel by the first brace surface.

In addition to one or more of the features described herein the first clamping mechanism includes a first selectively inflatable member mounted to the first brace arm and defining the first brace surface and the second clamping mechanism includes a second selectively inflatable member mounted to the second brace arm and defining the second brace surface.

In addition to one or more of the features described herein the docking actuator comprises a pump fluidically connected to at least one of the first selectively inflatable member and the second selectively inflatable member.

In addition to one or more of the features described herein a docking controller is operatively connected to docking mechanism, the docking controller controlling movement of the first brace surface and the second brace surface.

In addition to one or more of the features described herein a seating motor is operatively connected to the first support surface and the second support surface, the seating motor selectively shifting the first support surface and the second support surface along the gap axis.

A vehicle, in accordance with a non-limiting example, includes a body including a passenger compartment having a floor, and a wheelchair docking station arranged in the passenger compartment. The wheelchair docking station includes a first brace including a first brace arm, the first brace being mountable in the vehicle, and a second brace including a second brace arm, the second brace being mountable in the vehicle. The second brace is spaced from the first brace by a gap including a gap axis that is parallel to each of the first brace and the second brace. The first brace arm includes a first brace surface that is selectively shiftable toward the gap axis to engage a first wheel of the wheelchair, and the second brace arm includes a second brace surface that is selectively shiftable toward the gap axis to engage a second wheel of the wheelchair.

In addition to one or more of the features described herein a first support surface is arranged on a first side of the gap axis and a second support surface is arranged on a second side of the gap axis that is opposite the first side, the first brace being operatively connected to the first support surface and the second brace being operatively to the second support surface.

In addition to one or more of the features described herein a first clamping mechanism is mounted at the first support surface and coupled to the first brace surface and a second clamping mechanism is mounted at the second support surface and connected to the second brace surface, and a docking actuator is connected to the first clamping mechanism and the second clamping mechanism, the docking actuator being operable to shift the first brace surface toward the first wheel and the second brace arm toward the second wheel.

In addition to one or more of the features described herein the docking actuator includes a first motor operatively connected to the first brace arm and a second motor operatively connected to the second brace arm, the first motor including a first axle supporting a first drive member and the second motor including a second axle supporting a second drive member, the first motor being operable to shift the first brace arm across the first support surface and the second motor being operable to shift the second brace arm across the second support surface.

In addition to one or more of the features described herein the first axle extends substantially parallel to the gap axis and includes a first end and a second end opposite the first end, the first drive member including a first gear mounted to the first end and a second gear mounted to the second end and the second axle extends substantially parallel to the gap axis and includes a first end portion and a second end portion opposite the first end portion, the second drive member including a third gear mounted to the first end portion and a fourth gear mounted to the second end portion.

In addition to one or more of the features described herein a sensor coupled to the first motor, the sensor detecting a parameter of the first motor associated with pressure being applied to the first wheel by the first brace surface.

In addition to one or more of the features described herein the first clamping mechanism includes a first selectively inflatable member mounted to the first brace arm and defining the first brace surface and the second clamping mechanism includes a second selectively inflatable member mounted to the second brace arm and defining the second brace surface.

In addition to one or more of the features described herein the docking actuator comprises a pump fluidically connected to at least one of the first selectively inflatable member and the second selectively inflatable member.

In addition to one or more of the features described herein a docking controller is operatively connected to docking mechanism, the docking controller controlling movement of the first brace surface and the second brace surface.

In addition to one or more of the features described herein a seating motor is operatively connected to the first support surface and the second support surface, the seating motor selectively shifting the first support surface and the second support surface along the gap axis.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
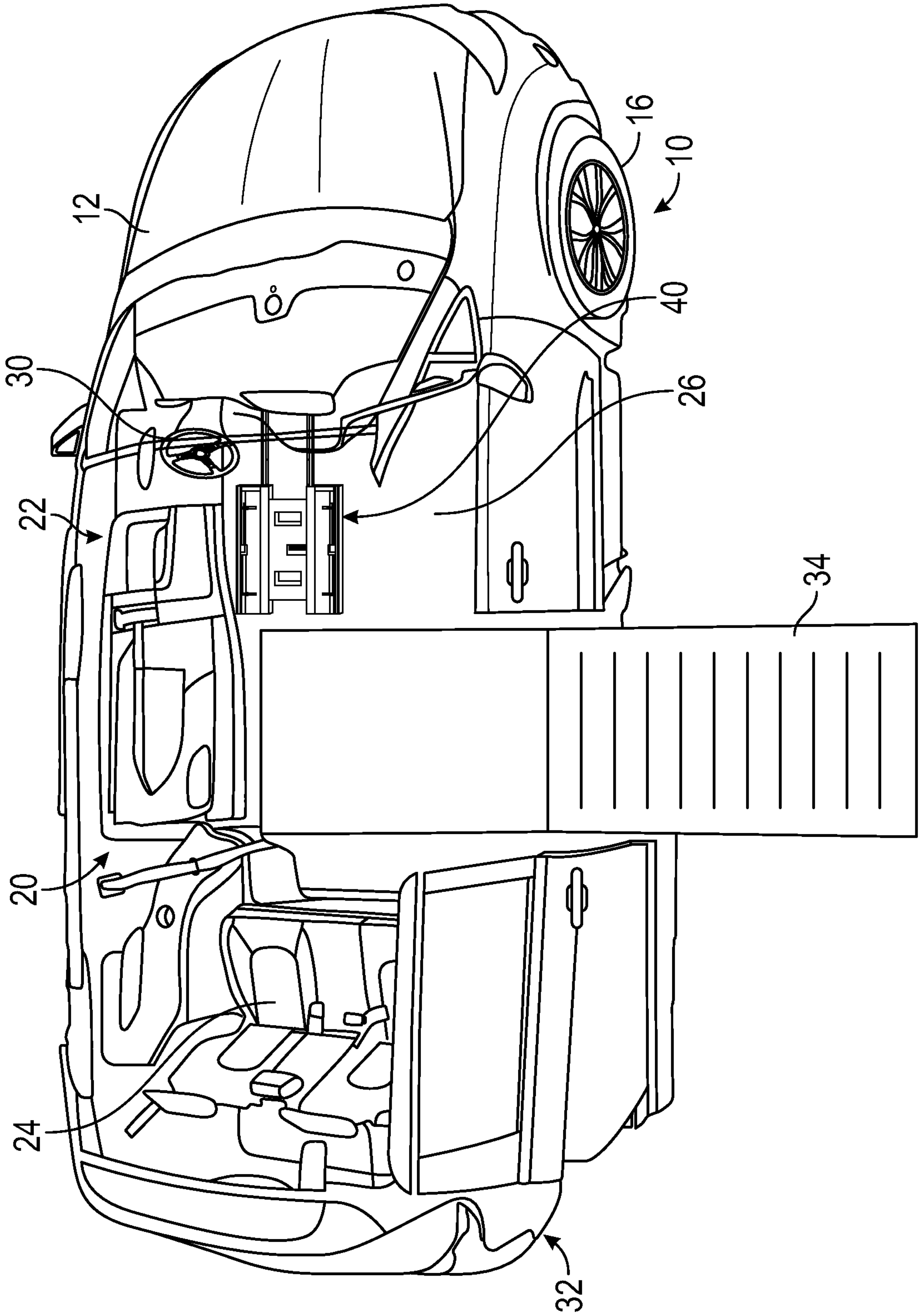
FIG. 1 is a top perspective glass view of a vehicle including a wheelchair docking system including a wheelchair clamping system, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that includes a non-transitory computer-readable medium having instructions stored thereon, that when executed by one or more modules may perform various functions including executing one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 supported on a plurality of wheels 16. Body 12 defines a passenger compartment 20 within which is defined a drivers position 22. Passenger compartment 20 is shown to include rear passenger seats 24 supported on a vehicle floor 26. A steering member 30 is arranged at drivers position 22. Vehicle 10 may take the form of a van 32 that includes a ramp 34 that provides wheelchair access to passenger compartment 20. In lieu of ramp 34, van 32 may include a powered lift (not shown). In a non-limiting example, drivers position 22 includes a wheelchair docking system 40.

Figure 2:
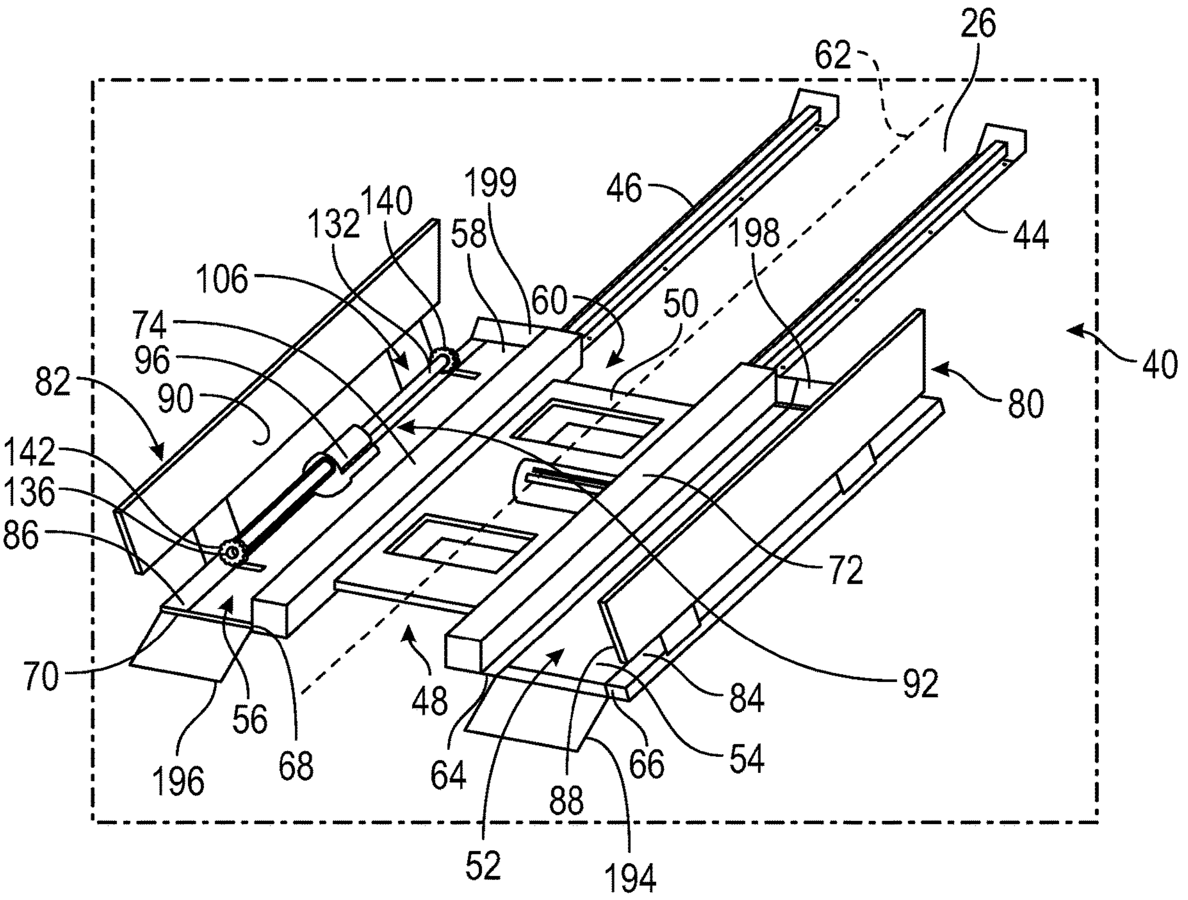
FIG. 2 is a lower right perspective view of the wheelchair docking system, in accordance with a non-limiting example.
Figure 3:
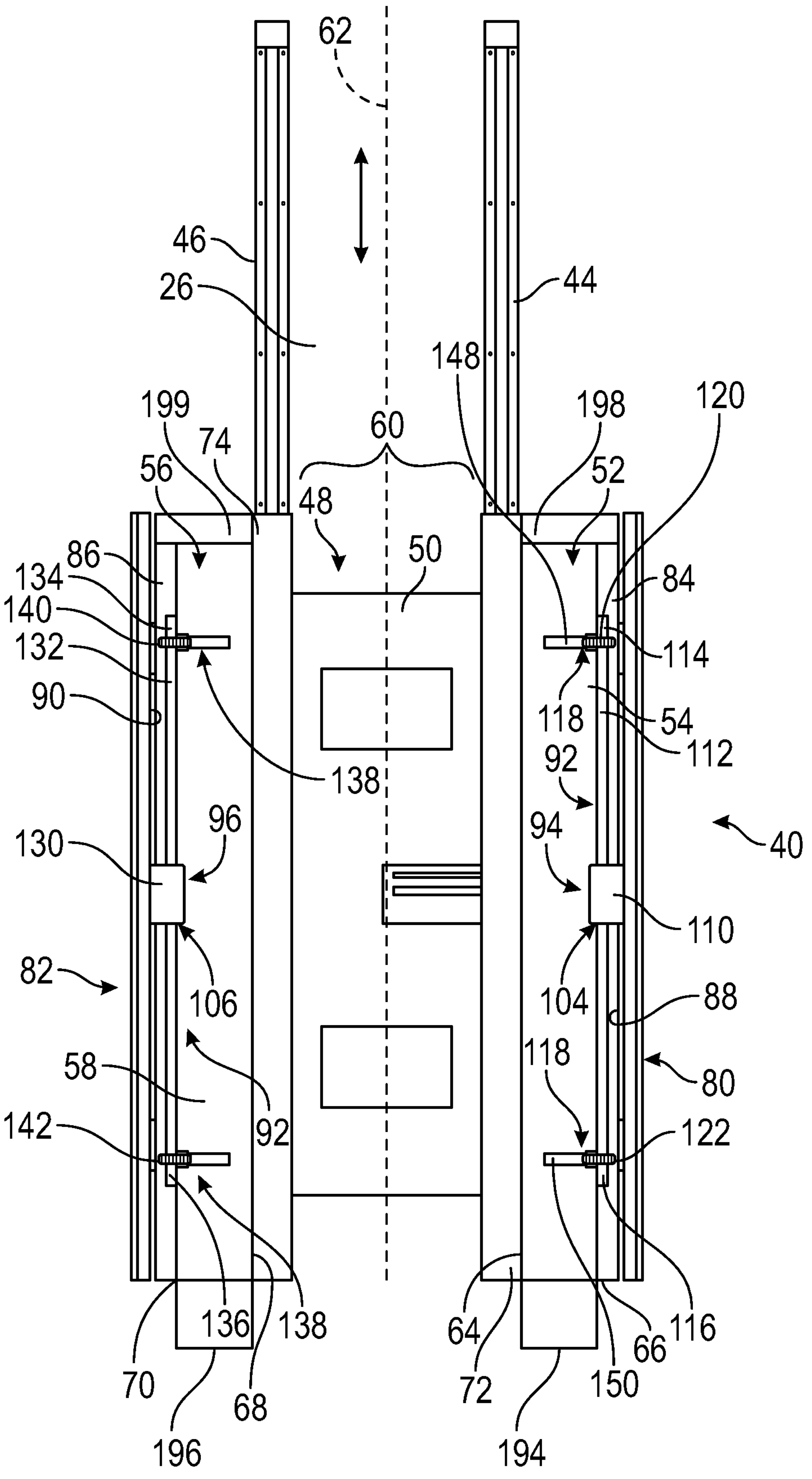
FIG. 3 is a top view of the wheelchair docking system of FIG. 2, in accordance with a non-limiting example.

Referring to FIGS. 2 and 3, wheelchair docking system 40 includes a first guide track 44 and a second guide track 46 mounted to vehicle floor 26. First guide track 44 and second guide track 46 extend fore-to-aft in passenger compartment 20. A drive mechanism 48 including a support plate 50 is connected to first guide track 44 and second guide track 46.

A first support member 52 including a first support surface 54 is mounted to support plate 50. A second support member 56 having a second support surface 58 is mounted to support plate 50 alongside first support member 52. First support member 52 is spaced from second support member 56 by a gap 60 having a gap axis 62 that is substantially parallel to first guide track 44 and second guide track 46.

Figure 4:
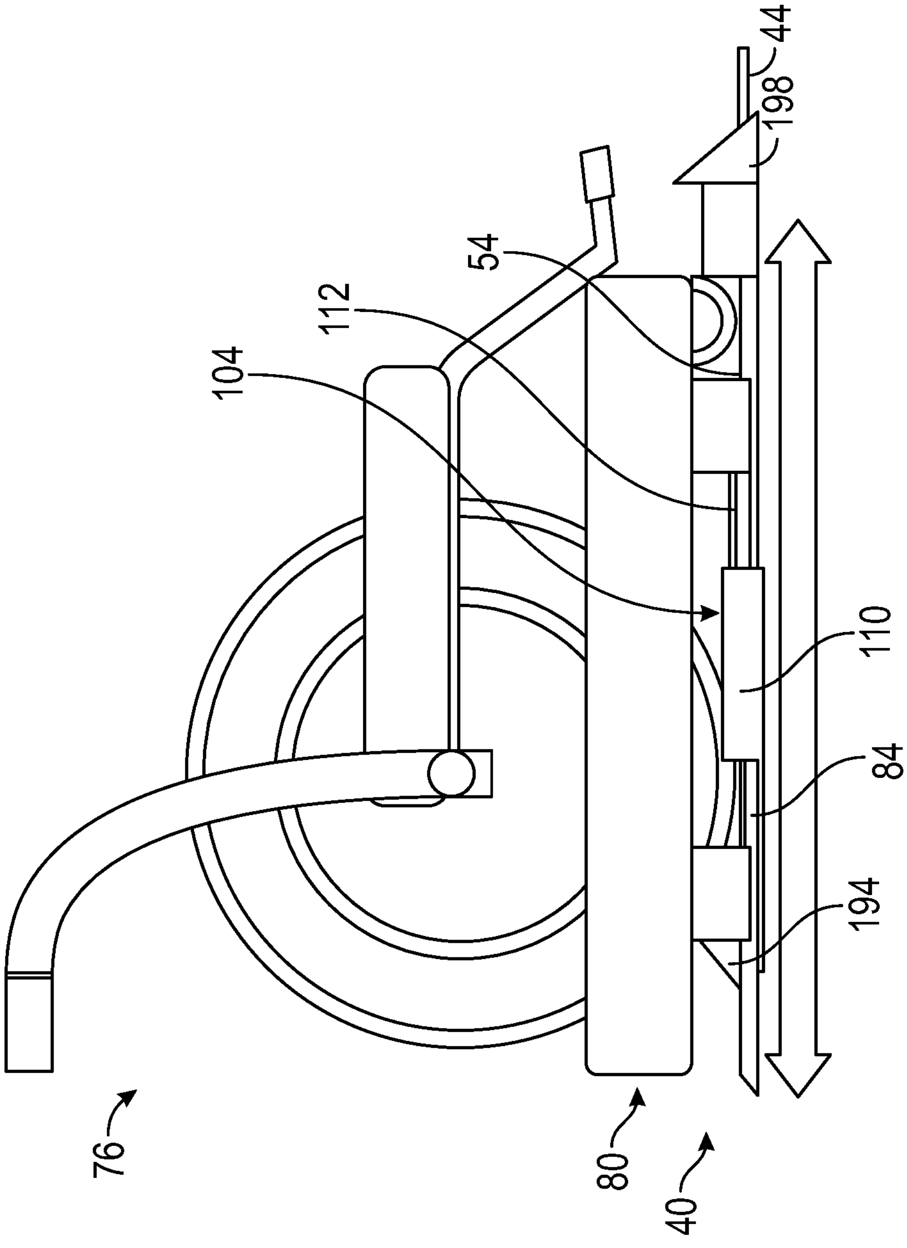
FIG. 4 is a right side view of the wheelchair docking system of FIG. 2, in accordance with a non-limiting example.

First support member 52 includes a first lateral side 64 and a second lateral side 66. Second support member 56 include a first lateral side portion 68 and a second lateral side portion 70. A first wall member 72 extends along first lateral side 64 and extends upwardly from first support surface 54. A second wall member 74 extends along first lateral side portion 68 and projects upwardly from second support surface 58. First wall member 72 and second wall member 74 act as guides for a wheelchair 76, FIG. 4. In accordance with a non-limiting example, once wheelchair 76 is secured on first support surface 54 and second support surface 58, drive mechanism 48 may be shifted for-to-aft, as shown in FIG. 4, in order to establish a comfortable driving position for an occupant.

Figure 5:
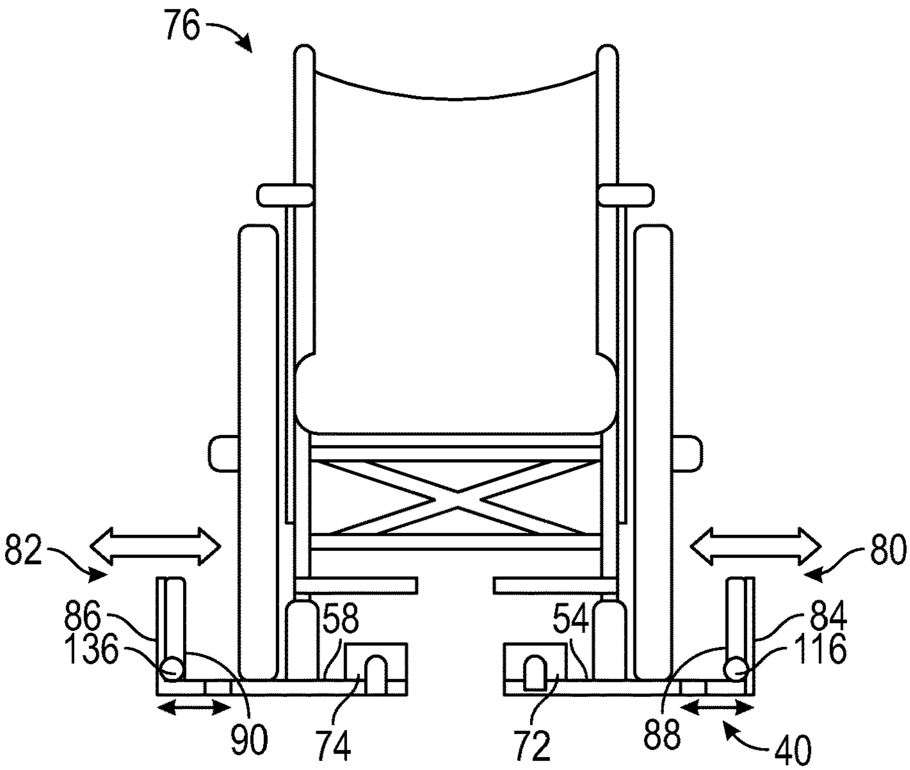
FIG. 5 is a rear view of the wheelchair docking system of FIG. 4 showing the clamping system in a wheelchair receiving position, in accordance with a non-limiting example.
Figure 6:
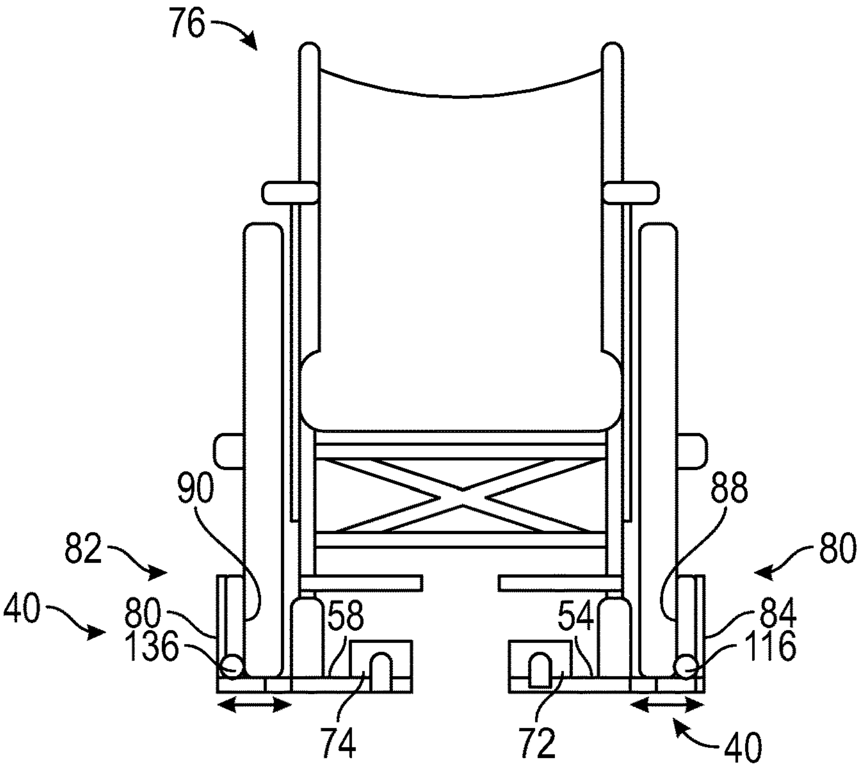
FIG. 6 is a rear view of the wheelchair docking system of FIG. 5 showing the clamping system in a wheelchair docking position, in accordance with a non-limiting example.

In addition to fore-to-aft shifting, wheelchair docking system 40 also secures wheelchair 76 to first support member 52 and second support member 56. In accordance with a non-limiting example, a first brace 80 is mounted along second lateral side 66 of first support member 52. A second brace 82 is mounted along second lateral side portion 70 of second support member 56. First brace 80 includes a first brace arm 84 mounted relative at first support surface 54. Second brace 82 includes a second brace arm 86 that is mounted at second support surface 58. In a non-limiting example, first brace arm 84 includes a first brace surface 88 that may shift in a direction substantially perpendicularly relative to gap axis 62. Second brace arm 86 includes a second brace surface 90 that may also shift in a direction substantially perpendicularly relative to gap axis 62. In a non-limiting example, first brace surface 88 and second brace surface 90 may take the form of rubberized surfaces that increase holding efficacy for the wheelchair. First brace arm 84 and second brace arm 86 are coupled to a clamping system 92 that causes first brace surface 88 and second brace surface 90 to move towards and/or away from one another to secure and/or release wheelchair 76 on wheelchair docking system 40 as shown in FIGS. 5 and 6.

In a non-limiting example, clamping system 92 includes a first clamping mechanism 94 connected with first brace arm 84 and a second clamping mechanism 96 connected with second brace arm 86. As will be discussed more fully herein, first clamping mechanism 94 and second clamping mechanism 96 selectively shift first brace arm 84 and second brace arm 86 relative to first support surface 54 and second support surface 58 respectively. First clamping mechanism 94 includes a first docking actuator 104 coupled to first brace arm 84 and second clamping mechanism 96 includes a second docking actuator 106 coupled to second brace arm 86.

In a non-limiting example, first docking actuator 104 includes a first electric motor 110 having a first axle 112 including a first end 114 and a second end 116. A first drive member 118 is mounted to first axle 112. First drive member 118 includes a first gear 120 mounted to first end 114 and a second gear 122 mounted to second end 116. In a similar manner, second docking actuator 106 includes a second electric motor 130 having a second axle 132 including a first end portion 134 and a second end portion 136. A second drive member 138 is mounted to second axle 132. Second drive member 138 includes a third gear 140 mounted to first end portion 134 and a fourth gear 142 mounted to second end portion 136. At this point, it should be understood that first docking actuator 104 and second docking actuator 106 can take on various forms and need not be limited to the examples shown. First docking actuator 104 and second docking actuator 106 may include gear driven systems, cable drive systems such as used with power seats, manually operated systems, and the like.

Figure 7:
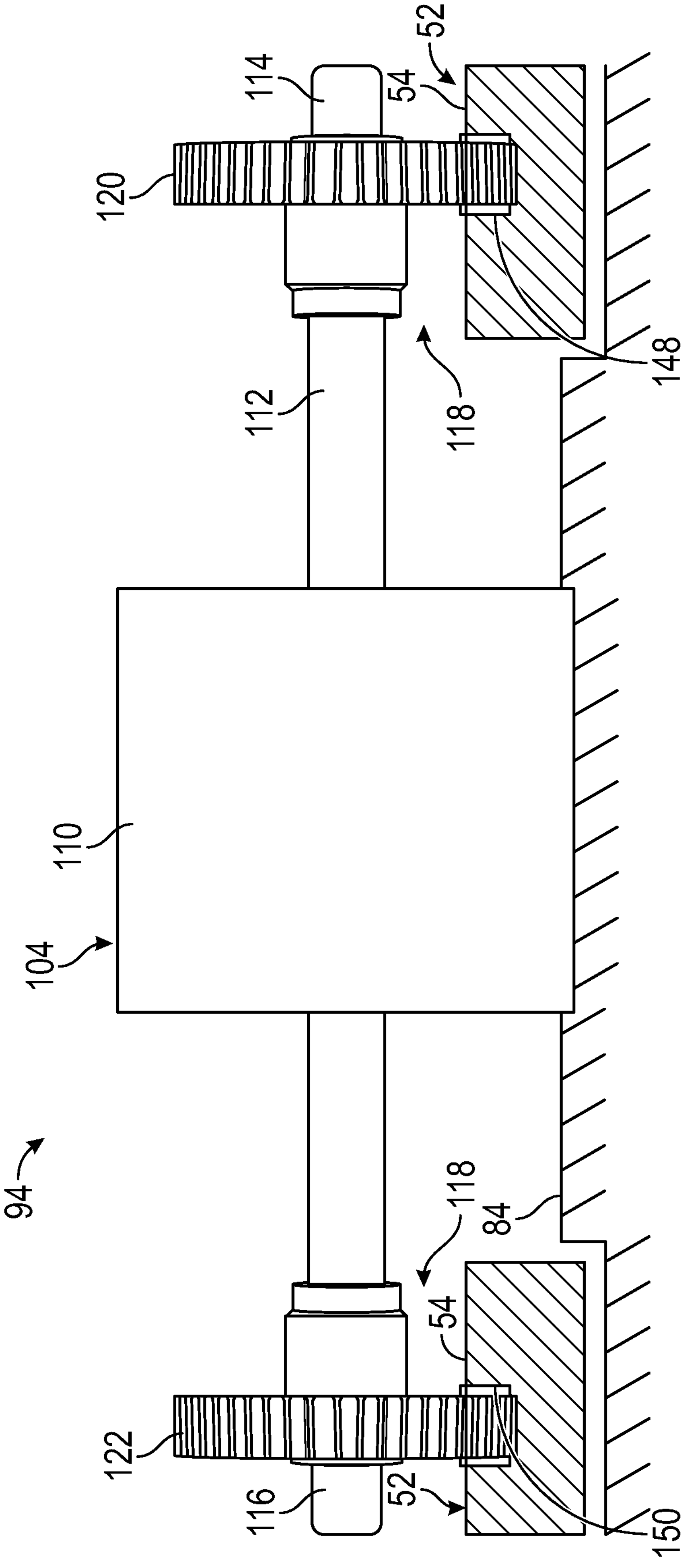
FIG. 7 is a plan view of a docking actuator of the wheelchair clamping system of the wheelchair docking system of FIG. 2 showing the clamping system in a wheelchair receiving position, in accordance with a non-limiting example.

Reference will now follow to FIG. 7 in describing the operation of first docking actuator 104 with an understanding that second docking actuator 106 operates in a similar fashion. In accordance with a non-limiting example, first support surface 52 includes a first gear track 148 that is receptive of first gear 120 and second support surface 56 includes a second gear track 150 that is receptive of second gear 122. In operation, when wheelchair 76 is resting on first support surface 52 and second support surface 56 first clamping mechanism 94 and second clamping mechanism 96 are activated.

When activated, first electric motor 110 rotates first gear 120 and second gear 122. First and second gears 120 and 122 engage with first and second gear tracks 148 and 150 causing first brace arm 84 to translate relative to first support member 52. Similarly, second electric motor 130 is activated causing second brace arm 86 to translate relative to second support surface 56 until first brace surface 88 and second brace surface 90 come together and clamp against wheelchair 76 or separate to release the wheelchair 76 as shown in FIGS. 5 and 6. In a non-limiting example, first clamping mechanism 94 and second clamping mechanism 96 may also include a manual override or release that releases wheelchair 76 in the event of a loss of power.

Figure 8:
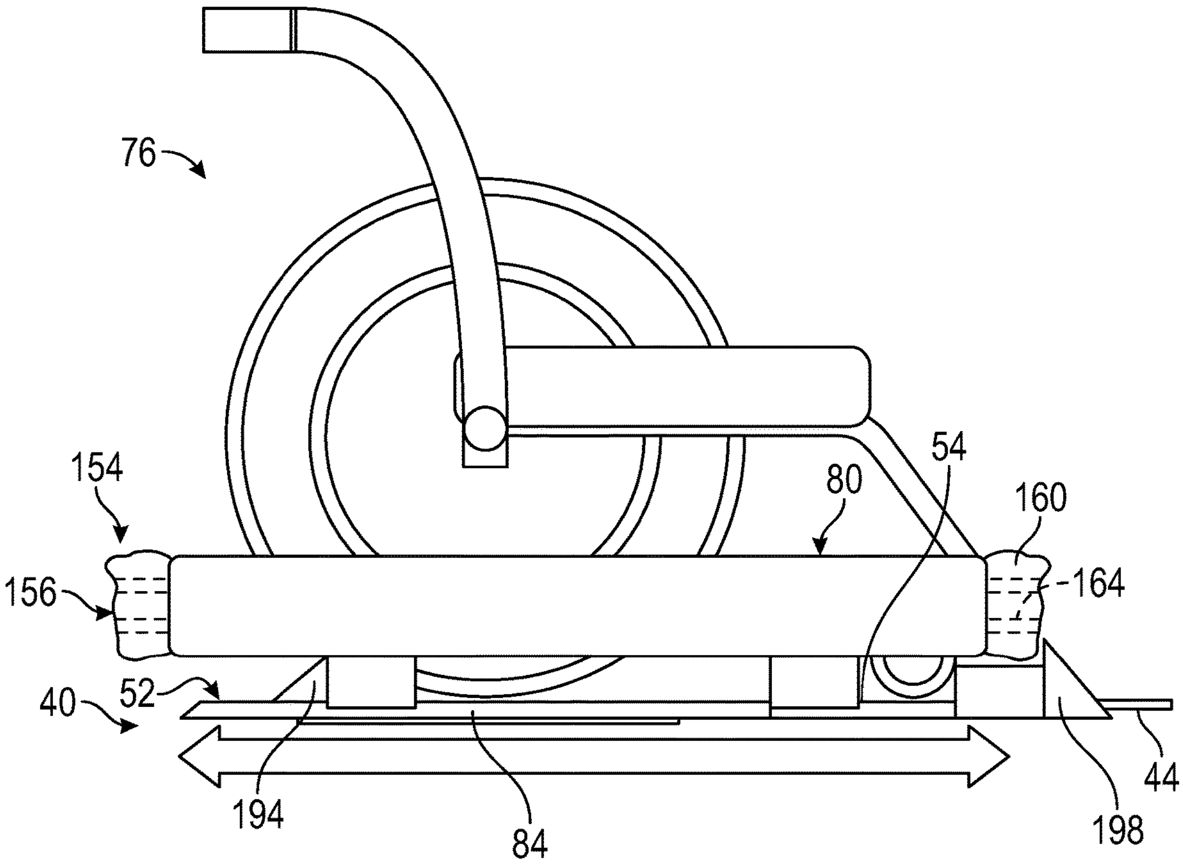
FIG. 8 is a side view of the wheelchair docking system of FIG. 2 showing a clamping system, in accordance with another non-limiting example.
Figure 9:
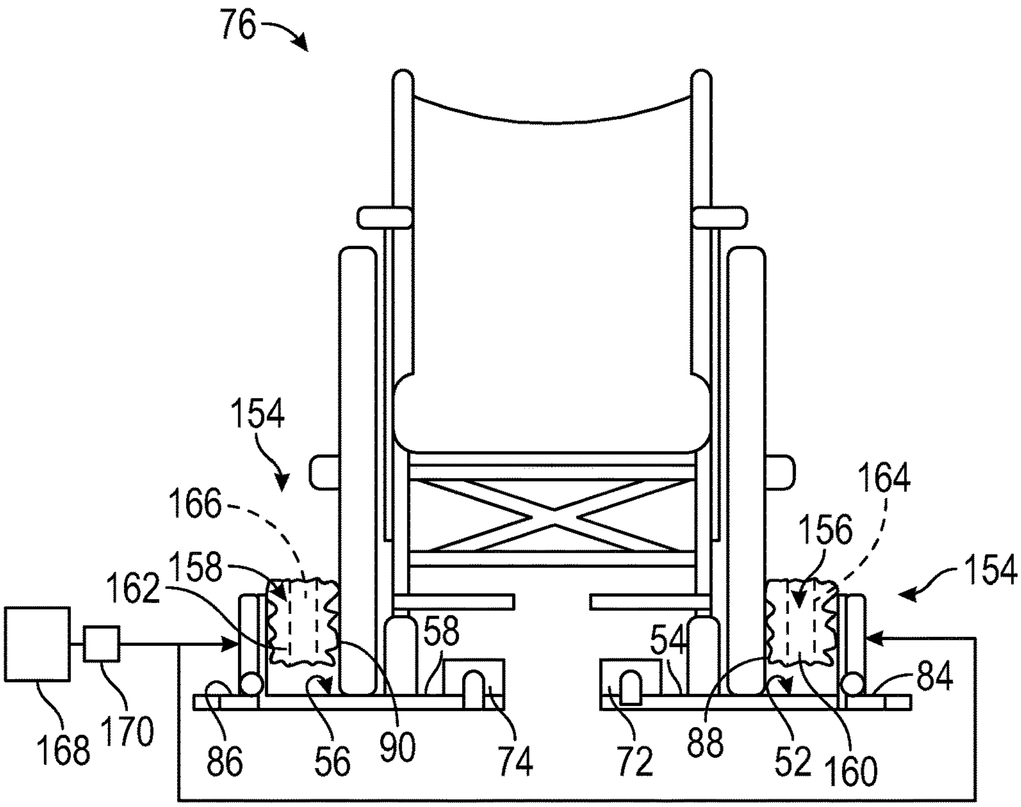
FIG. 9 is a rear view of the wheelchair docking system of FIG. 2 showing a clamping system in a wheelchair receiving position, in accordance with another non-limiting example.
Figure 10:
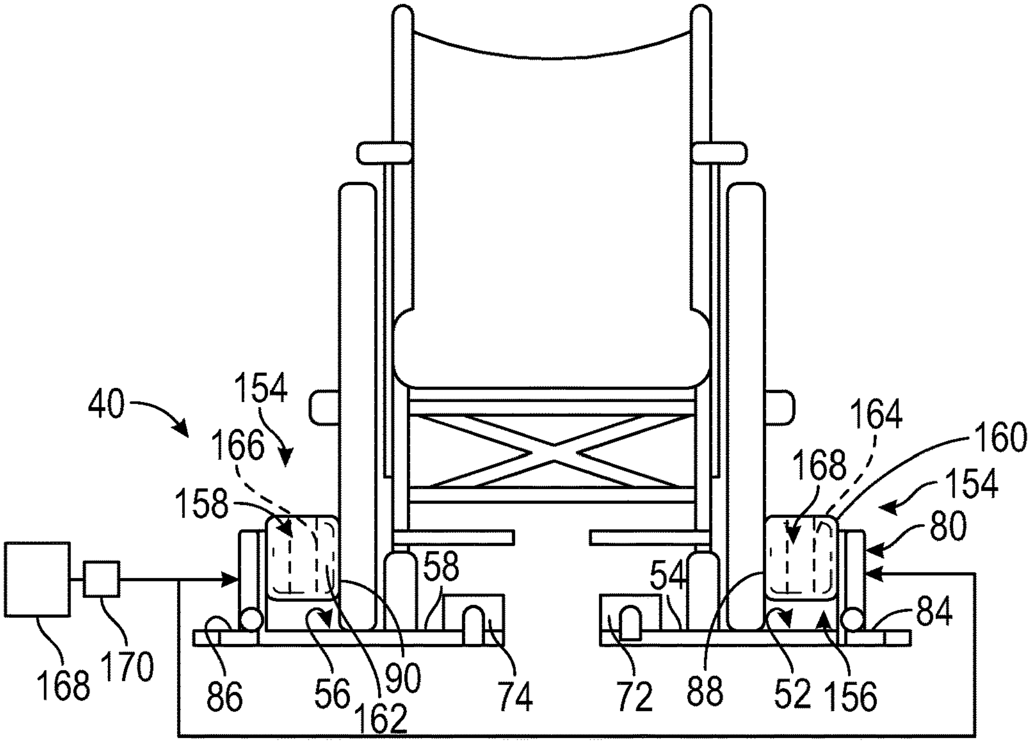
FIG. 10 is a rear view of the wheelchair docking system of FIG. 9 showing the clamping system in a wheelchair docking position, in accordance with a non-limiting example.

Reference will now follow to FIGS. 8, 9, and 10 in describing a clamping system 154 in accordance with another non-limiting example. Clamping system 154 includes a first clamping mechanism 156 and a second clamping mechanism 158. First clamping mechanism 156 takes the form of a first selectively inflatable air bag 160. First selectively inflatable airbag is mounted to first brace arm 84 and defines first brace surface 88. Second clamping mechanism 158 takes the form of a second selectively inflatable airbag 162. Second selectively inflatable airbag 162 is mounted to second brace arm 86 and defines second brace surface 90. First and second selectively inflatable airbags 160 and 162 may include reinforcing features such as tensegrity lines 164 and 166.

In a non-limiting example, a docking actuator 168 is coupled to first airbag 160 and second airbag 162. Docking actuator 168 includes a pump 170 that inflates first airbag 160 and second airbag 162 such that first brace surface 88 and second brace surface 90 exert a clamping force on wheelchair 76 resting on first support surface 54 and second support surface 58. Docking actuator 168, in addition to inflating first airbag 160 and second airbag 162, may also promote deflation in order to release wheelchair 76. At this point, it should be understood one of the first and second airbags 160 and 162 may be mounted in a drivers and/or passenger door of vehicle 10. That is, the drivers and/or passenger door may form first brace 80.

Figure 11:
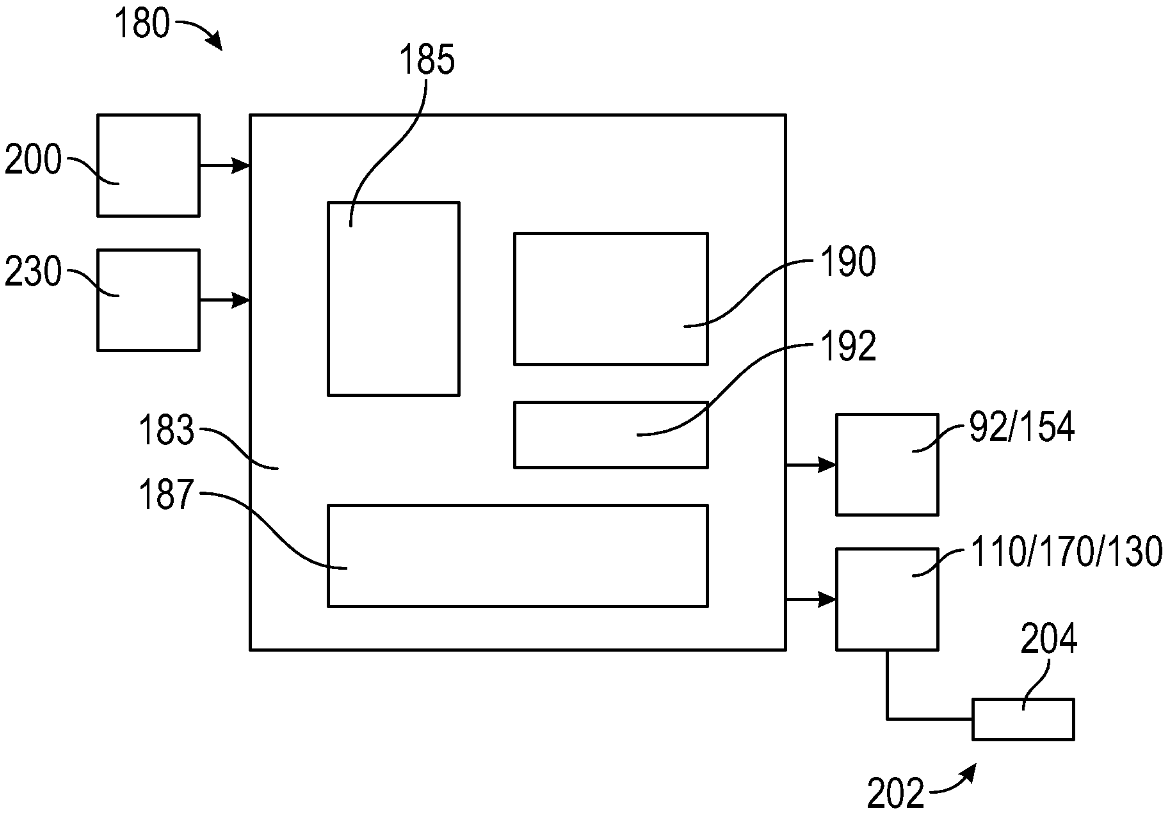
FIG. 11 is a block diagram illustrating a docking controller for the wheelchair docking system, in accordance with a non-limiting example.

Reference will now follow to FIG. 11 in describing a docking control 180 in accordance with a non-limiting example. Docking control 180 includes a controller 183 including a central processing unit (CPU) 185, a non-volatile memory 187, a drive member control module 190, and a clamping system actuator module 192. Non-volatile memory 187 includes a non-transitory computer-readable medium having instructions stored thereon, that when executed by one or more modules may perform various functions including executing one or more software or firmware programs, a combinational logic circuit, and/or other suitable components that clamp and shift the wheelchair between a loading/unloading configuration and a driving configuration.

In a non-limiting example, an individual in wheelchair 76 may be lifted into passenger compartment 20. The individual manipulates the wheelchair along a first ramp member 194 and a second ramp member 196 (FIG. 2) onto first support member 52 and second support member 56. Wheelchair 76 proceeds onto first support member 52 and second support member 56 to a first forward stop member 198 and a second forward stop member 199 (FIG. 2). Once aboard first support member 52 and second support member 56, first ramp member 194 and second ramp member 196 may be rotated to create a rear hard stop that limits rearward movement of the wheelchair. At this point, an actuator 200 coupled to clamping system 92/154 is activated causing first brace surface 88 and second brace surface 90 to shift toward gap axis 62 and engage with wheelchair 76. Actuator 200 may form part of a key fob, a computer application, a smart phone application, or a hard wired button or may be integrated into a vehicle start feature. Actuator 200 may communicate with controller 183 directly through a wired connection or indirectly through a wireless communication protocol including, for example Bluetooth®. In a non-limiting example, first brace surface 88 and second brace surface 90 may act against wheels of the wheelchair as shown in FIGS. 6 and 9.

In a non-limit example, clamping system actuator module 192 may receive feedback from one or more sensors 202 that detect a clamping force on wheelchair 76. Clamping force may be determined by a current sensor 204, (e.g, sensing a drive current for motors 110/130 or pump 170). When the drive current reaches a predetermined threshold stored in non-volatile memory 187, motors 110/130 or pump 170 may be turned off. Clamping system actuator module 192 may also deploy forward and rear chocks 210 and 220 that limit forward and rearward movement of the wheelchair relative to first support member 52 and second support member 56.

Once secured, a drive member actuator 230 may be activated to signal drive member control module 190 to activate drive mechanism 48 causing first support member 52 and second support member 56 to shift into a driving position. The driving position may be stored in non-volatile memory 187 or may be adjusted each time wheelchair docking system 40 is accessed. At this point, the individual may initiate driving feeling fully secure in the wheelchair. Once at a desired destination, the individual in the wheelchair may reverse the above process to exist vehicle 10.

The non-limiting examples described herein may be utilized in connection with a wide array of wheelchair sizes, shapes and technologies including manual wheelchairs and motorized wheelchairs. Further, the non-limiting examples disclosed may be integrated with a restrain system that not only retains the wheelchair but also retains and secures a wheelchair occupant. Still further, the clamping system may be integrated into vehicle safety alert systems in which chimes may sound of wheelchair 76 is not fully secured.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A wheelchair docking station for a wheelchair in a vehicle, the wheelchair docking station comprising:

a first brace including a first brace arm, the first brace being mountable in the vehicle;

a second brace including a second brace arm, the second brace being mountable in the vehicle, the second brace being spaced from the first brace by a gap including a gap axis that is parallel to each of the first brace and the second brace;

wherein the first brace arm includes a first brace surface that is selectively shiftable toward the gap axis to engage a first wheel of the wheelchair and is operatively connected to a first support surface on a first side of the gap axis, and a first clamping mechanism is mounted at the first support surface and coupled to the first brace surface;

wherein the second brace arm includes a second brace surface that is selectively shiftable toward the gap axis to engage a second wheel of the wheelchair and is operatively connected to a second support surface on a second side of the gap axis, and a second clamping mechanism is mounted at the second support surface and connected to the second brace surface; and a docking actuator connected to the first clamping mechanism and the second clamping mechanism, the docking actuator being operable to shift the first brace surface toward the first wheel and the second brace arm toward the second wheel, wherein the docking actuator includes a first motor operatively connected to the first brace arm and a second motor operatively connected to the second brace arm, the first motor including a first axle supporting a first drive member and the second motor including a second axle supporting a second drive member, the first motor being operable to shift the first brace arm across the first support surface and the second motor being operable to shift the second brace arm across the second support surface.

2. The wheelchair docking station according to claim 1, wherein the first axle extends substantially parallel to the gap axis and includes a first end and a second end opposite the first end, the first drive member including a first gear mounted to the first end and a second gear mounted to the second end and the second axle extends substantially parallel to the gap axis and includes a first end portion and a second end portion opposite the first end portion, the second drive member including a third gear mounted to the first end portion and a fourth gear mounted to the second end portion.

3. The wheelchair docking station according to claim 2, further comprising a sensor coupled to the first motor, the sensor detecting a parameter of the first motor associated with pressure being applied to the first wheel by the first brace surface.

4. The wheelchair docking station according to claim 1, wherein the first clamping mechanism includes a first selectively inflatable member mounted to the first brace arm and defining the first brace surface and the second clamping mechanism includes a second selectively inflatable member mounted to the second brace arm and defining the second brace surface.

5. The wheelchair docking station according to claim 4, wherein the docking actuator comprises a pump fluidically connected to at least one of the first selectively inflatable member and the second selectively inflatable member.

6. The wheelchair docking station according to claim 1, further comprising a docking controller operatively connected to docking mechanism, the docking controller controlling movement of the first brace surface and the second brace surface.

7. The wheelchair docking station according to claim 1, further comprising a seating motor operatively connected to the first support surface and the second support surface, the seating motor selectively shifting the first support surface and the second support surface along the gap axis.

8. A vehicle comprising:

a body including a passenger compartment having a floor; and a wheelchair docking station arranged in the passenger compartment, the wheelchair docking station comprising:

a first brace including a first brace arm, the first brace being mounted to the floor;

a second brace including a second brace arm, the second brace being mounted to the floor, the second brace being spaced from the first brace by a gap including a gap axis that is parallel to each of the first brace and the second brace;

wherein the first brace arm includes a first brace surface that is selectively shiftable toward the gap axis to engage a first wheel of a wheelchair and is operatively connected to a first support surface on a first side of the gap axis, and a first clamping mechanism is mounted at the first support surface and coupled to the first brace surface;

wherein the second brace arm includes a second brace surface that is selectively shiftable toward the gap axis to engage a second wheel of the wheelchair and is operatively connected to a second support surface on a second side of the gap axis that is opposite the first side, and a second clamping mechanism is mounted at the second support surface and connected to the second brace surface; and a docking actuator connected to the first clamping mechanism and the second clamping mechanism, the docking actuator being operable to shift the first brace surface toward the first wheel and the second brace arm toward the second wheel, wherein the docking actuator includes a first motor operatively connected to the first brace arm and a second motor operatively connected to the second brace arm, the first motor including a first axle supporting a first drive member and the second motor including a second axle supporting a second drive member, the first motor being operable to shift the first brace arm across the first support surface and the second motor being operable to shift the second brace arm across the second support surface.

9. The vehicle according to claim 8, wherein the first axle extends substantially parallel to the gap axis and includes a first end and a second end opposite the first end, the first drive member including a first gear mounted to the first end and a second gear mounted to the second end and the second axle extends substantially parallel to the gap axis and includes a first end portion and a second end portion opposite the first end portion, the second drive member including a third gear mounted to the first end portion and a fourth gear mounted to the second end portion.

10. The vehicle according to claim 9, further comprising a sensor coupled to the first motor, the sensor detecting a parameter of the first motor associated with pressure being applied to the first wheel by the first brace surface.

11. The vehicle according to claim 8, wherein the first clamping mechanism includes a first selectively inflatable member mounted to the first brace arm and defining the first brace surface and the second clamping mechanism includes a second selectively inflatable member mounted to the second brace arm and defining the second brace surface.

12. The vehicle according to claim 11, wherein the docking actuator comprises a pump fluidically connected to at least one of the first selectively inflatable member and the second selectively inflatable member.

13. The vehicle according to claim 8, further comprising a docking controller operatively connected to docking mechanism, the docking controller controlling movement of the first brace surface and the second brace surface.

14. The vehicle according to claim 8, further comprising a seating motor operatively connected to the first support surface and the second support surface, the seating motor selectively shifting the first support surface and the second support surface along the gap axis.

* * * * *